Patented Apr. 27, 1926.

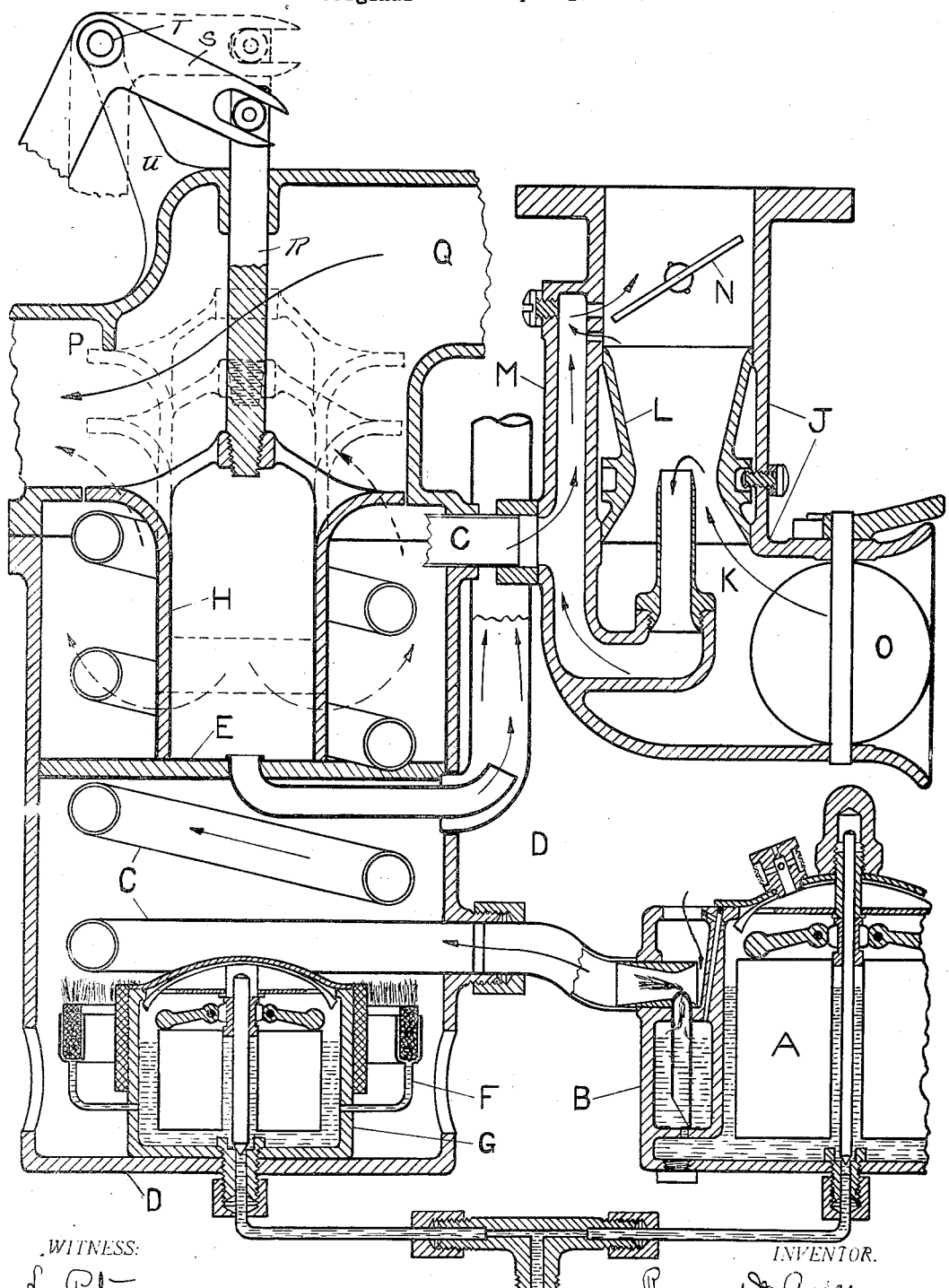

1,582,654

UNITED STATES PATENT OFFICE.

RAYMOND M. ANDERSON, OF DETROIT, MICHIGAN, ASSIGNOR TO GEORGE M. HOLLEY, OF DETROIT, MICHIGAN.

VAPORIZER FOR INTERNAL-COMBUSTION ENGINES.

Application filed September 1, 1920, Serial No. 407,509. Renewed September 21, 1925.

*To all whom it may concern:*

Be it known that I, RAYMOND M. ANDERSON, a citizen of the United States, residing at Detroit, in the county of Wayne and State of Michigan, have invented certain new and useful Improvements in Vaporizers for Internal-Combustion Engines, of which the following is a specification.

This invention relates to improvements in vaporizers for internal combustion engines.

The purpose of this invention is to combine with an exhaust-heated vaporizer of the type in which a hot rich mixture is diluted with the main body of air, the latter being unheated so as not to reduce the charge density, an independent heating burner or lamp, which will supply a constant amount of heat to compensate for the variable heat supplied by the exhaust, and which will, especially, supply the necessary quantity of heat to enable an engine of the four-cycle type to operate at low loads with kerosene as fuel, the temperature of the exhaust under these conditions being lower than that required for the complete vaporization of the kerosene.

This device also eliminates the necessity for fitting a gasoline priming attachment to a kerosene vaporizer.

The figure shows the vaporizer together with the mixing chamber and float chamber.

In the figure:

The float chamber A supplies a fuel nozzle B, which delivers fuel into the coil C, which is heated by the vaporizer D, which vaporizer is divided into two parts by the partition E. The lower half of the vaporizer is heated by the annular lamp F, which may be of any well-known type. The annular lamp F is furnished with fuel from the float chamber G, which obtains its fuel from the same pipe as does the float chamber A, which furnishes fuel to the coil C.

The upper portion of the vaporizer D is heated by the exhaust which is controlled by the valve "H", so that when the valve "H" is lowered so that its lower edge is in contact with the partition "E", the coil "C" receives heat indirectly only from the exhaust, the constant heat from the burner "F" being unaffected thereby, and when the valve "H" is raised to its uppermost position, the exhaust then flows from "Q" to "P" through the coil, as shown by the dotted arrows. The valve "H" therefore acts as a shunt to control the exhaust heat in the well known manner. A small portion of the exhaust which escapes with the products of combustion from the lamp F assists the draft in the lamp chimney. The coil C is connected to the mixing chamber J, which provides two paths for the vapor, namely—K, delivered into a restricted portion L, of the mixing chamber, and M, which delivers in the vicinity adjacent to the throttle N, located in the outlet of the mixing chamber J. This portion of the device corresponds to that shown in my co-pending application, Serial No. 412,060, filed September 22, 1920. The throttle O is used for starting purposes only. The exhaust which heats the upper portion of the vaporizer D arrives by the pipe Q and leaves by the pipe P. The exhaust is controlled by the valve H by means of the shaft R which is guided in the pipe P and is moved by a bell crank lever S, which turns on a fulcrum T, which fulcrum is located on the bracket U projecting from the pipe P.

Operation: The operation of the device is as follows:

Before starting the engine, the lamp F is lighted and the shutter O is partially closed, and the engine is cranked in the usual way. The rich mixture supplied through C is then admitted to the engine above the throttle N with such air as leaks past the throttle O. The exhaust control H is raised to the upper position so as to give a maximum amount of heat to the coil C.

When the engine has been run for a minute, the throttle O may be opened, and, after the engine has been run for ten minutes, the exhaust control H may be wholly or partially closed, depending on the temperature of the air.

Owing to the fact that the fuel jet delivers directly into that portion of the coil which is heated by the lamp, the fuel is always subjected to a constant quantity of heat.

The order in which the heat is applied, namely—first the constant heat from the burner, followed by the variable and regulated heat from the exhaust—is one of the factors contributing to the success of this combination.

The temperature of the exhaust gases in Q increases with the speed and the load, increasing from 300° F. at the lowest loads and speeds to 1400° F. at the high loads and speeds. As the transfer of heat from this exhaust to the rich mixture is only effective by the amount the temperature of the exhaust is higher than the boiling point of the fuel, which boiling point is in the vicinity of 300° F., it follows that the variable heat of the exhaust gases is quite inadequate to take care of the complete vaporization of the fuel at the lower engine speeds and loads, hence to the variable exhaust heat a constant heat furnished by a burner is provided.

What I claim is:—

1. In a vaporizer, a mixing chamber having an air entrance and a rich mixture entrance, a liquid fuel supply, a conduit conveying air and fuel from the fuel supply to said rich mixture entrance, one portion of said rich mixture conduit being heated by passing thru a chamber thru which pass the products of combustion from an independent heating burner and another portion of said conduit by the variable heat supplied from the exhaust of the engine to which the said vaporizer is attached.

2. In a vaporizer, a mixing chamber having an air entrance and a rich mixture entrance, a liquid fuel supply, a conduit conveying air and fuel from said liquid fuel supply to said rich mixture entrance, a portion of said rich mixture conduit being heated continuously by an independent heating burner, the heat being applied to the outside of the said conduit, another portion of said conduit being heated at the same time the heating burner is in operation by the variable and adjustably controlled supply of exhaust heat from the engine to which this said vaporizer is attached.

3. In a vaporizer, a mixing chamber having a main air entrance, a liquid fuel supply chamber, a metering orifice regulating the flow of fuel therefrom, an auxiliary air passage into which the fuel is metered, said air passage conveying not over 20% of the air required for combustion, a conduit for conveying the rich mixture thereby formed from the fuel nozzle to the main air entrance, means for heating said rich mixture conduit by an independent heating burner, the heat being applied to the outside of said conduit, and means for simultaneously heating another portion of the said conduit by means of a variable supply of heat available in the exhaust of the engine to which the said vaporizer is attached.

4. In a vaporizer, a mixing chamber having an air entrance and a rich mixture entrance, a liquid fuel supply, a conduit conveying air and fuel from said liquid fuel supply to said rich mixture entrance, a portion of said rich mixture conduit being heated continuously by an independent heating burner, the heat being applied to the outside of the said conduit, another portion of said conduit being heated at the same time that the heating burner is in operation by the variable supply of exhaust heat from the engine to which this said vaporizer is attached.

In testimony whereof I affix my signature.

RAYMOND M. ANDERSON.